(12) United States Patent
Weaver

(10) Patent No.: US 7,031,338 B2
(45) Date of Patent: Apr. 18, 2006

(54) SYSTEM AND METHOD FOR THE CONSOLIDATION OF DATA PACKETS

(75) Inventor: Jeffrey S. Weaver, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 901 days.

(21) Appl. No.: 09/940,359

(22) Filed: Aug. 27, 2001

(65) Prior Publication Data

US 2003/0039248 A1   Feb. 27, 2003

(51) Int. Cl.
*H04J 3/16*   (2006.01)
*H04L 12/66*  (2006.01)

(52) U.S. Cl. .................. 370/465; 370/355; 370/392; 370/471

(58) Field of Classification Search .......... 370/230.1, 370/358, 389, 391, 393, 355, 392, 401, 465, 370/466, 467, 471
See application file for complete search history.

(56) References Cited

U.S. PATENT DOCUMENTS

| 6,003,089 | A | * | 12/1999 | Shaffer et al. ............. 709/233 |
| 6,389,038 | B1 | * | 5/2002 | Goldberg et al. ........... 370/471 |
| 6,438,137 | B1 | * | 8/2002 | Turner et al. .............. 370/466 |
| 6,567,428 | B1 | * | 5/2003 | Rubin et al. ............... 370/538 |
| 6,707,826 | B1 | * | 3/2004 | Gorday et al. ............. 370/468 |
| 2001/0014087 | A1 | * | 8/2001 | Sugaya et al. ............. 370/337 |
| 2002/0103953 | A1 | * | 8/2002 | Das et al. .................. 710/105 |
| 2004/0114516 | A1 | * | 6/2004 | Iwata et al. ............... 370/230.1 |

* cited by examiner

*Primary Examiner*—Afsar Qureshi

(57) ABSTRACT

A system and method for optimizing the transmission of a plurality of data packets, each packet having a next-hop address, across a data network are provided. The method includes receiving the data packets at the network traffic device, buffering the data packets, identifying a selected data packet, identifying a second data packet with the same next-hop address as the selected data packet, consolidating the selected data packet with the second data packet to form a consolidated packet, and transmitting the consolidated data packet. The system and method of the present invention are particularly applicable to the optimization of voice data traffic.

17 Claims, 7 Drawing Sheets

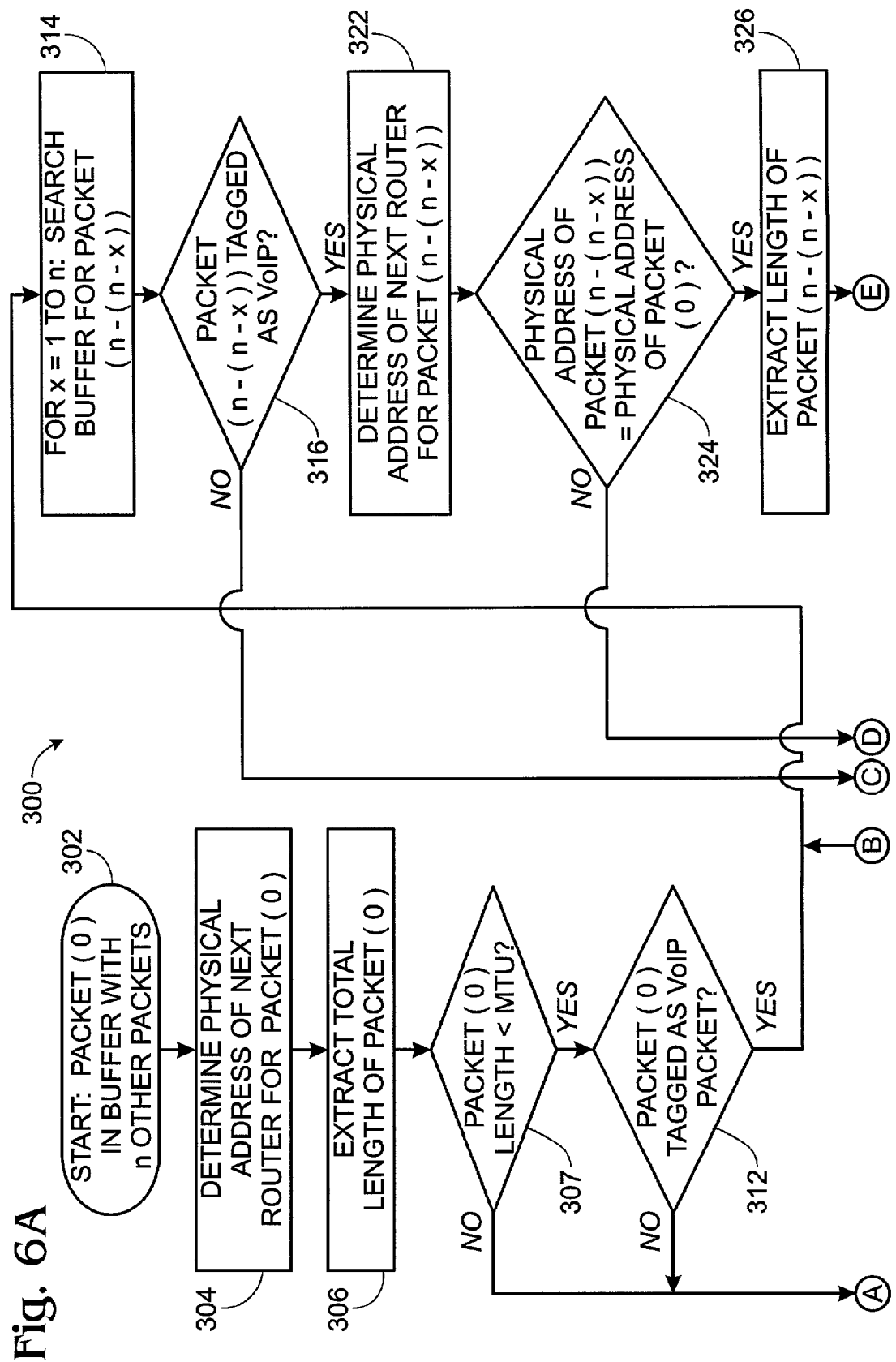

SYSTEM AND METHOD FOR THE CONSOLIDATION OF DATA PACKETS

TECHNICAL FIELD

The present invention provides a system and method for consolidating a plurality of data packets into a single consolidated packet at a network traffic device.

BACKGROUND

Converged networks, in which data and voice are transmitted over the same network, are becoming increasingly popular. Transmitting voice via a data network offers several advantages over the use of a traditional voice network. For example, long-distance calls over a traditional voice network generally have a higher cost than long-distance calls over a data network. Because voice signals are transformed to data during a telephone call over a data network, calls made over a wide area data network (WAN) generally cost no more than calls made over a local area network (LAN), as the cost of sending data across a data network is generally not a function of the distance between the communicating parties.

The equipment necessary to enable voice transmission over a data network generally includes a gateway, which is a computer used to interface an analog telephone line to the data network. The gateway converts voice signals to and from the correct format for the data network protocols, and also may compress the voice data, demodulate fax signals, etc. Many different network protocols may be used to send voice data. Because of the widespread implementation of versions of the internet protocol (IP) over both LANs and WANs, IP is becoming the most common network protocol for voice transmission. The transmission of voice data over an IP network is generally referred to as VoIP.

In a VoIP telephone call, it is important to introduce as little delay as possible into the voice signal so that the telephone call does not sound choppy to the callers. While some delays are fixed, such as delays due to processing time at packet processing points and delay inherent in the physical transmission systems, other delays are variable. Sources of variable delay include queuing times at packet processing points and congestion on the network.

To achieve data transmission with as little delay as possible, current VoIP technology may employ the use of priority schemes that exist in various transport protocols, such as priority queuing at routers and bridges, to alleviate variable delay problems. However, the use of prioritization has several drawbacks. First, prioritization causes other types of data to back up at packet processing points, slowing the overall movement of data across the network. Second, prioritization routines may require the use of additional header information, increasing the size of packets and using additional network bandwidth.

Another common problem with current VoIP technology concerns the size and quantity of voice data packets generated during a typical IP telephone call. It is preferred to encapsulate short segments of voice data, typically approximately 10 milliseconds, into a single packet to preserve the natural sound of the telephone call and to avoid perceptible delays in the voice streams. However, due to efficient data compression algorithms, a packet containing this amount of data is typically much smaller than the maximum transmission unit (MTU) of a typical network component encountered by the packet as it crosses the network. Thus, a large quantity of small voice data packets may be generated per unit time during telephone calls, taking up network bandwidth with the associated large number of headers. Therefore, there remains a need for a method and a system for decreasing the amount of network resources consumed by the transmission of VoIP telephone calls.

SUMMARY OF THE INVENTION

The present invention provides a system and method for optimizing the transmission of a plurality of data packets across a data network at a network traffic device, each of the plurality of packets having a next-hop address. The method involves: receiving the data packets at the network traffic device, buffering the data packets, identifying a selected data packet, identifying a second data packet with the same next-hop address as the selected data packet, consolidating the selected data packet with the second data packet to form a consolidated packet, and transmitting the consolidated data packet. The system and method of the present invention are particularly applicable to the optimization of voice data traffic.

BRIEF DESCRIPTION OF THE DRAWINGS

FIGS. 6A and 6B are a flow diagram of a second method of consolidating packets according to the method of FIG. 3.

DETAILED DESCRIPTION OF THE PREFERRED EMBODIMENTS

The present invention provides a system and method for reducing traffic over a data network. The system and method may be implemented in any desired type of network traffic device, such as a router, bridge or switch, and on any desired packet data network, such as an IP network.

Figure 1:
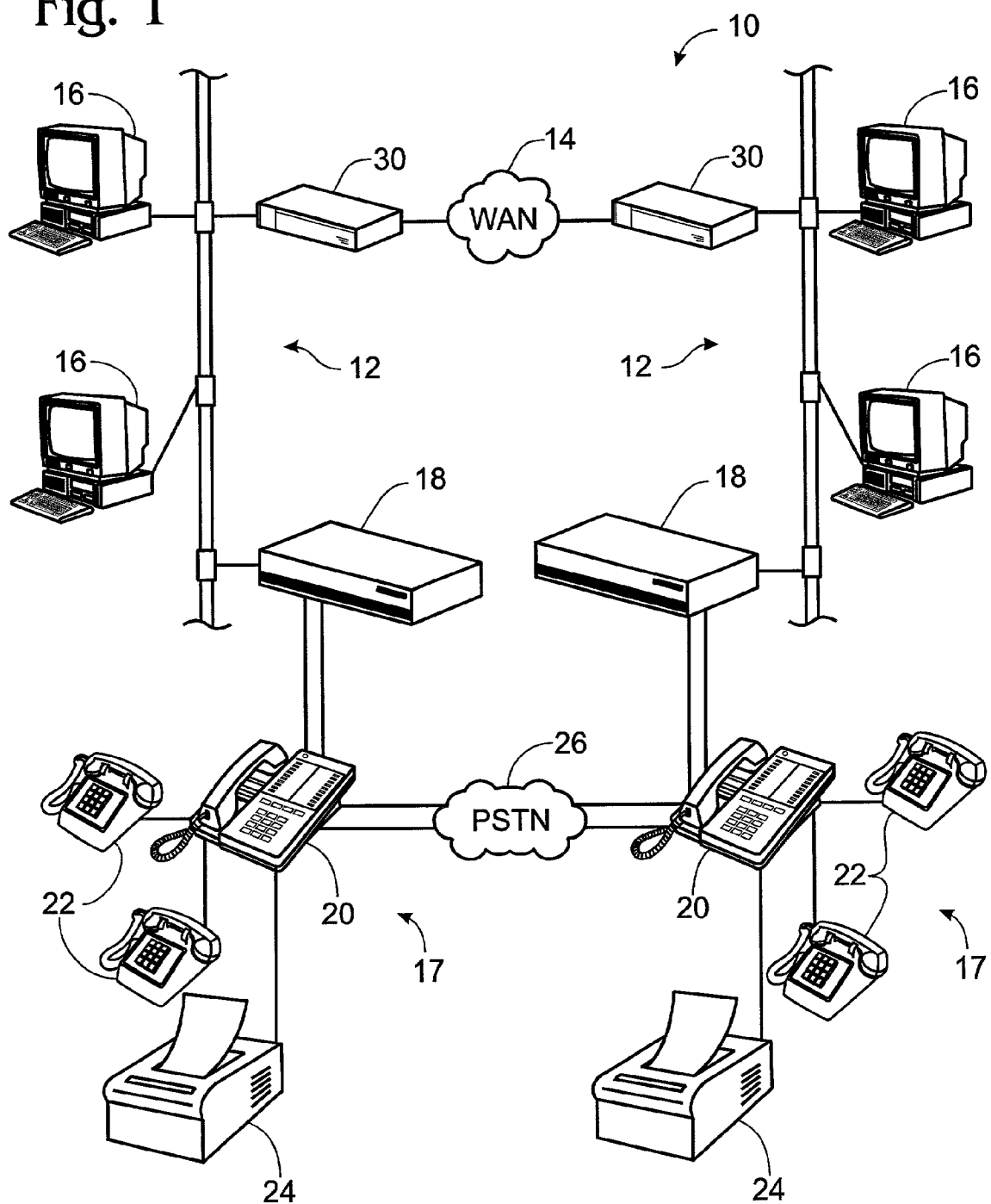
FIG. 1 is a schematic diagram of an exemplary converged voice/data network.

A simple schematic of an exemplary converged IP network is shown generally at 10 in FIG. 1. IP network 10 includes two LANs 12 linked together over a WAN 14. Each LAN 12 includes a plurality of data storage, processing and transmission devices, such as personal computers 16. The converged network also includes a traditional voice telephone network 17 linked to each LAN 12 via an IP gateway 18. Gateway 18 may be connected to the traditional voice network either via a direct connection to a telephone receiver, or via a connection to a private branch exchange 20 (PBX). The use of PBX 20 allows a plurality of telephones 22 and fax machines 24 to be linked to IP network 10. PBX 20 will also generally have a connection to a public switched telephone network 26 (PSTN). IP network 10 also includes a plurality of network traffic devices, such as routers 30, that link each LAN to the WAN.

Figure 2:
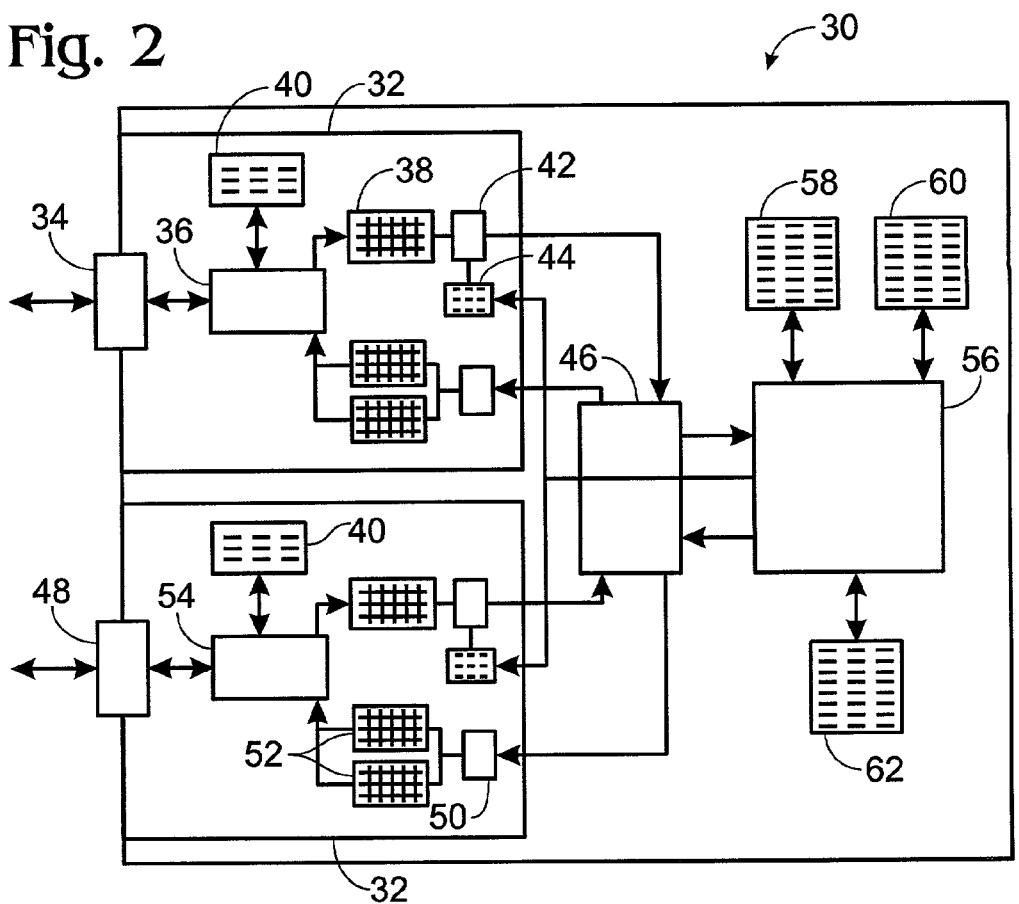
FIG. 2 is a block diagram of a typical router showing some of the major components of the router.

A simple block diagram of an exemplary router 30 is shown in FIG. 2. Router 30 includes a plurality of network interface cards 32 for interfacing the router with the physical medium of IP network 10. Each network interface card 32 includes at least one media interface 34, and a link protocol controller 36 to process frames (packets encapsulated in a data-link layer header) received at the media interface.

Link protocol controller 36 performs data-link layer protocol functions for both incoming and outgoing frames. As an example, for an incoming frame, link protocol controller 36 checks for the integrity of the frame, removes the frame header from the packet, and forwards the packet to an input memory or buffer 38. For an outgoing packet, link protocol controller 36 finds the hardware address for the packet's next destination on the network ("next-hop address") using an associated hardware address table 40, adds a frame header with the address to the packet, and transmits the frame onto the network via media interface 34.

Incoming packets buffered in input buffer 38 drain into a forwarding engine 42. Forwarding engine 42 checks a forwarding table 44 to find the media interface corresponding to the next-hop address for the packet. If the corresponding media interface is not on the same network interface card 32, then a switch 46 sends the packet to the correct network interface card. The packet is processed by an output buffer manager 50 and then buffered in an output memory or buffer 52. A network interface card may have more than one output buffer, as shown in FIG. 2 and described below. A link protocol controller 54 associated with media interface 48 then adds a new frame header to the packet and transmits the packet to the next-hop address.

Router 30 also has a processor 56 for controlling many of the forwarding, switching and other functions of the router. For example, processor 56 controls the updating of a routing table 58 (which contains information on other routers on the network), a router management table 60 (which contains information on router 30), and a filter table 62 (which contains information on packets to be filtered, e.g. for a firewall). Processor 56 also performs other functions, such as updating forwarding tables 44 of network interface cards 32.

In the present invention, router 30 is configured to optimize network traffic by consolidating packets received by the router before transmitting the packets across the network. The consolidation reduces the number of headers needed to transmit the packets, and thus reduces the overall amount of traffic sent over the network.

Figure 3:
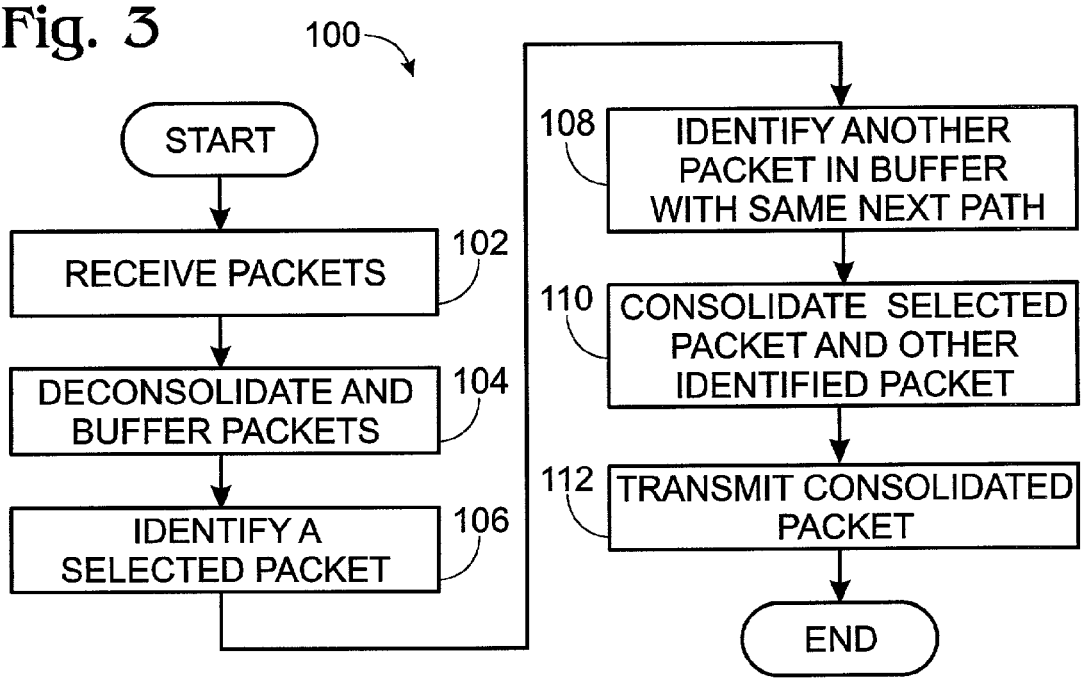
FIG. 3 is a flow diagram showing a first embodiment of a method for optimizing the transmission of a plurality of data packets across a data network according to the present invention.

One embodiment of a method for optimizing network traffic according to the present invention is shown generally at 100 in FIG. 3. Method 100 includes receiving packets at 102, the packets being received at network interface 34. At 104, the method includes deconsolidating any received consolidated packets, and then buffering the received packets. Once the received packets have been buffered, a selected packet is identified at 106 for potential consolidation. Next, another buffered packet with the same next-hop address as the selected packet is identified at 108, and is consolidated with the selected packet at 110 to form a consolidated packet. Finally, the consolidated packet is transmitted at 112. Transmission of the consolidated packet requires only a single data link frame header to be added to the consolidated packet (whereas the transmission of the two packets individually would require the use of two headers), thus saving network bandwidth. It will be appreciated that more than two packets may be consolidated into a single consolidated packet. The number of packets that may be consolidated will generally be limited by the MTU of the output interface from which the consolidated packet is transmitted.

Figure 4:
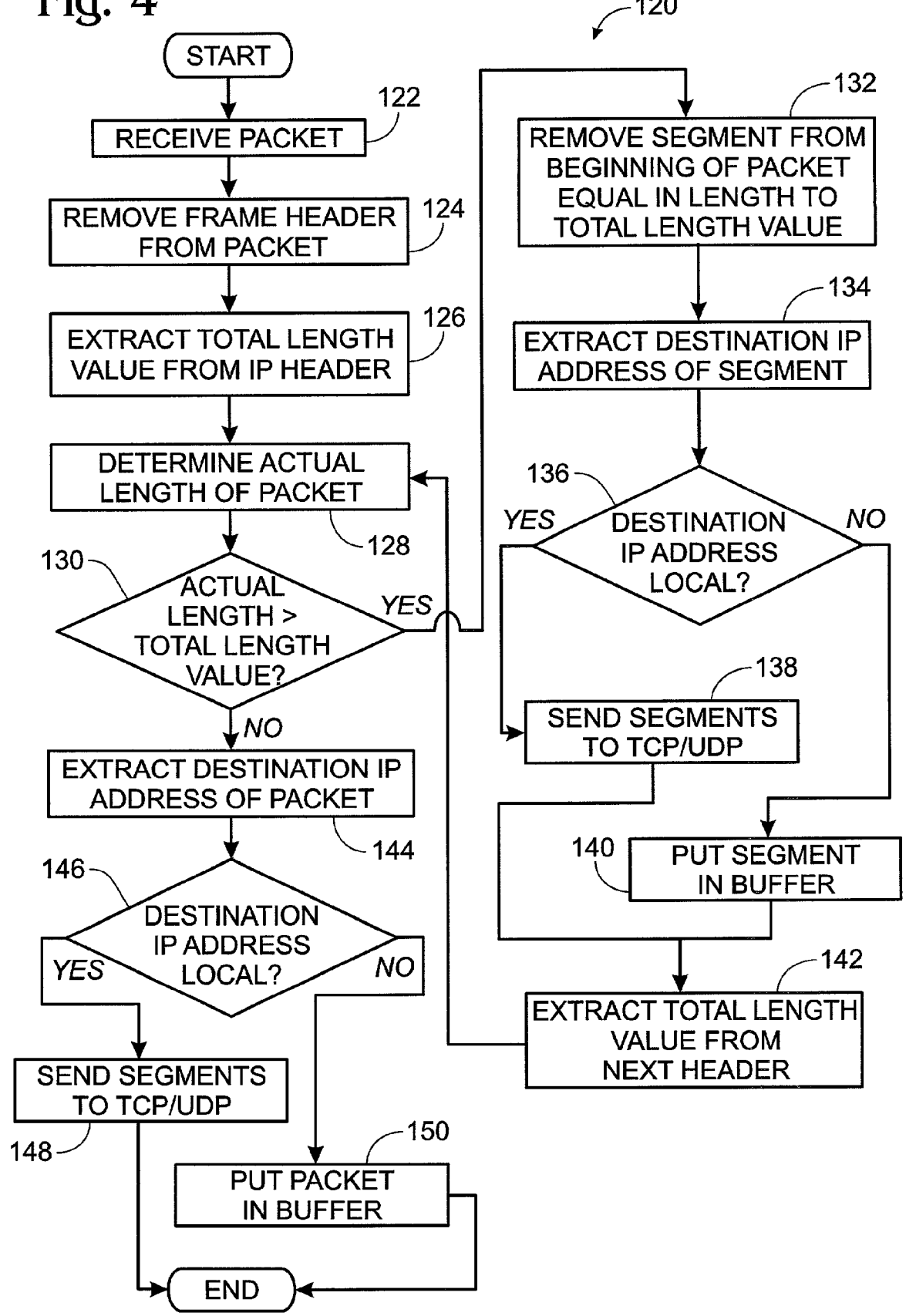
FIG. 4 is a flow diagram of a method of deconsolidating consolidated packets according to the embodiment of FIG. 3.

The individual steps of method 100 may be performed in any suitable manner. For example, FIG. 4 shows generally at 120 one embodiment of a suitable method of deconsolidating and buffering received packets. According to method 120, after a packet is received at 122, the frame header is removed from the packet at 124. As described in more detail below, a consolidated packet generally consists of two or more individual IP packets arranged end-to-end. Thus, the first six 32-bit words of a consolidated packet will be the header of the first individual IP packet contained within the consolidated packet. This header includes a field giving a total length value for the individual IP packet. To determine whether an incoming packet is consolidated, the total length value from the header at the beginning of the packet is extracted at 126, the actual length of the received packet is determined at 128, and the two values are compared at 130.

If the actual length of the packet is greater than the total length value extracted from the header, a deconsolidation subroutine is entered. First, a segment equal in length to the total length value from the header is removed at 132 from the front end of the received packet. This segment is then processed as an individual IP packet. First, the destination address of the segment is extracted from the header at 134, and then compared to local addresses of the router interfaces at 136. If the address is local, the segment is forwarded to the appropriate location for TCP/UDP processes at 138. If the address is not local, then the segment is forwarded to a desired buffer at 140, where it is buffered to await transmission or consolidation. The desired buffer may be input buffer 38, output buffer 52 or any other suitable buffer. Furthermore, the packet may be sorted into one of an array of buffers that are separated by selected criteria, such as next-hop address, to assist in the consolidation process.

Next, the remaining portion of the received consolidated packet is processed. The beginning of the remaining portion will once again be the IP header of the next packet in the remaining portion. To determine whether the remaining portion includes more than one IP packet, the next header is examined to extract the total length value at 142. The subroutine then returns to step 128, where the actual length of the remaining portion of the consolidated packet is determined. The actual length is then compared to the total length value at 130. If the actual length is still greater than the total length value extracted from the header, then a segment equal in length to the total length value is again removed from the beginning of the remaining portion at 132. The subroutine defined by steps 128 to 142 will continue to loop until the received consolidated packet has been completely deconsolidated.

Eventually, when the received consolidated packet has been completely deconsolidated, the total length value extracted at step 142 will be equal to the actual length of the last IP packet segment determined at step 128. At this point, the deconsolidation routine exits the subroutine defined by steps 128 to 142. Next, the IP destination address of the final segment is determined at 144. This destination address is compared to a list of local addresses at 146. If the destination address is local, then the packet is forwarded for TCP/UDP at 148. If it is not local, then the packet is buffered in the appropriate output buffer at 150 to await transmission or consolidation. Each of the steps of method 120 may be performed by processor 56, by a processor on the network interface card 32 at which the consolidated packet is received, or by any other desired processor within router 30.

Referring again to FIG. 3, once the received packet has been completely deconsolidated and the individual IP packets produced by the deconsolidation have been buffered at 104, a selected packet is identified at 106 for potential consolidation. The selected packet may be identified by any of a number of potential identifiers. At the simplest level, a selected packet may be identified for potential consolidation simply by being received and buffered. Under this scenario, each received packet will undergo processing for potential consolidation in a first-in-first-out manner.

According to another identification scheme, a selected packet could be identified for potential consolidation at 106 by the type of data contained within the packet. For example, because the data portion of a voice packet tends to be very small compared to the size of the header, these packets are very desirable to consolidate. Therefore, the step of identifying a selected packet may include identifying a selected voice data packet. This could be performed in a number of ways. For example, the data within each received packet could be examined to determine the type of the data.

Likewise, the packet could be examined for some kind of indicator contained within the packet indicating that the packet is eligible for consolidation. For example, because voice packets are sometimes prioritized using priority flags, the packet could be examined to determine the existence of a priority flag. Alternatively, the gateway software that generates the voice data packets could be configured to add a tag to the packet header indicating that the packet contains voice data. Under these circumstances, a packet could be identified at 106 for potential consolidation by the presence or absence of the tag. While this example has been described in the context of voice packets, it will be appreciated that a packet containing any other desired type of data could be identified in a similar fashion.

Figure 5A:
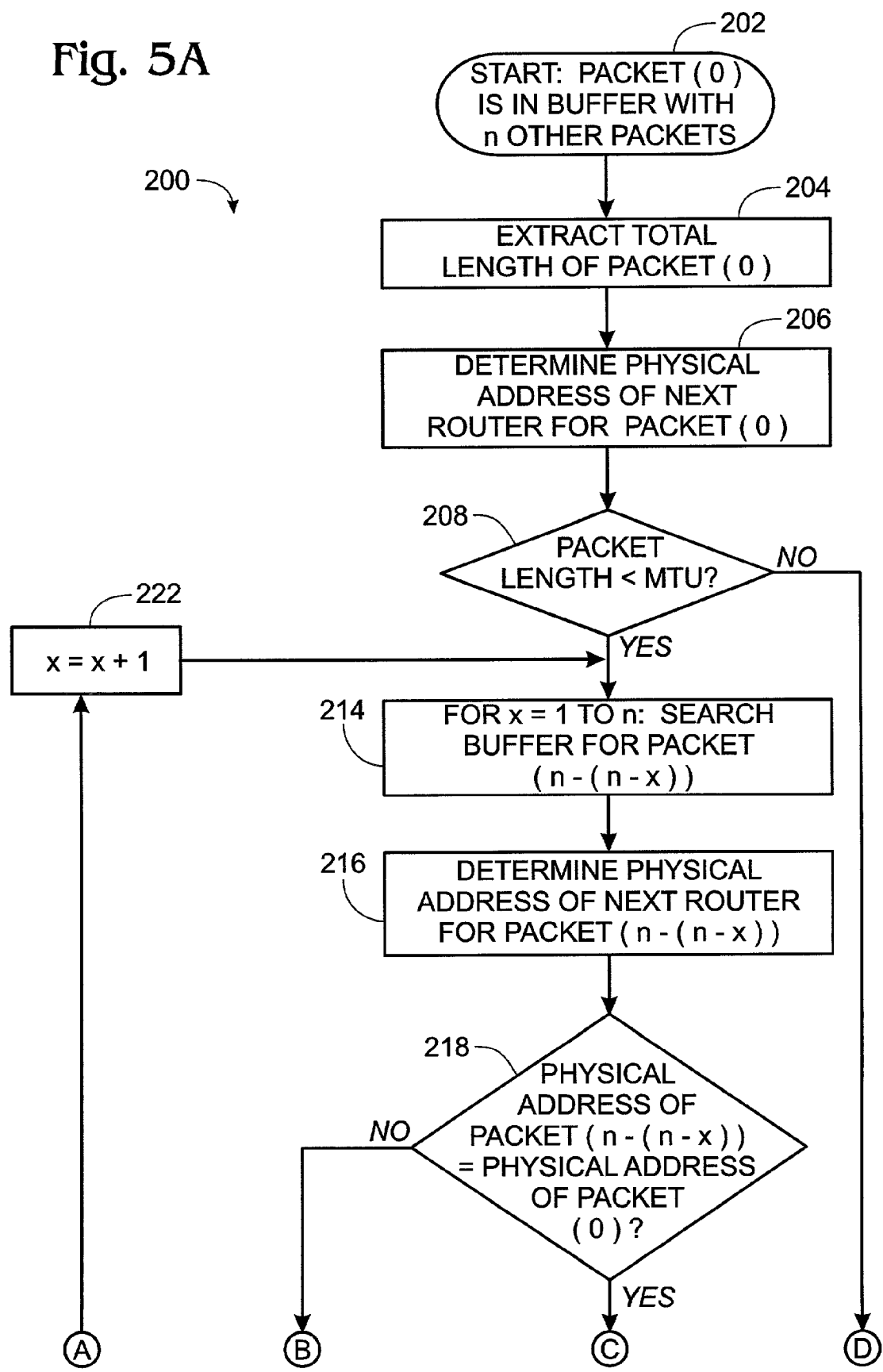
FIGS. 5A and 5B are a flow diagram of a first method of consolidating packets according to the embodiment of FIG. 3.
Figure 5B:
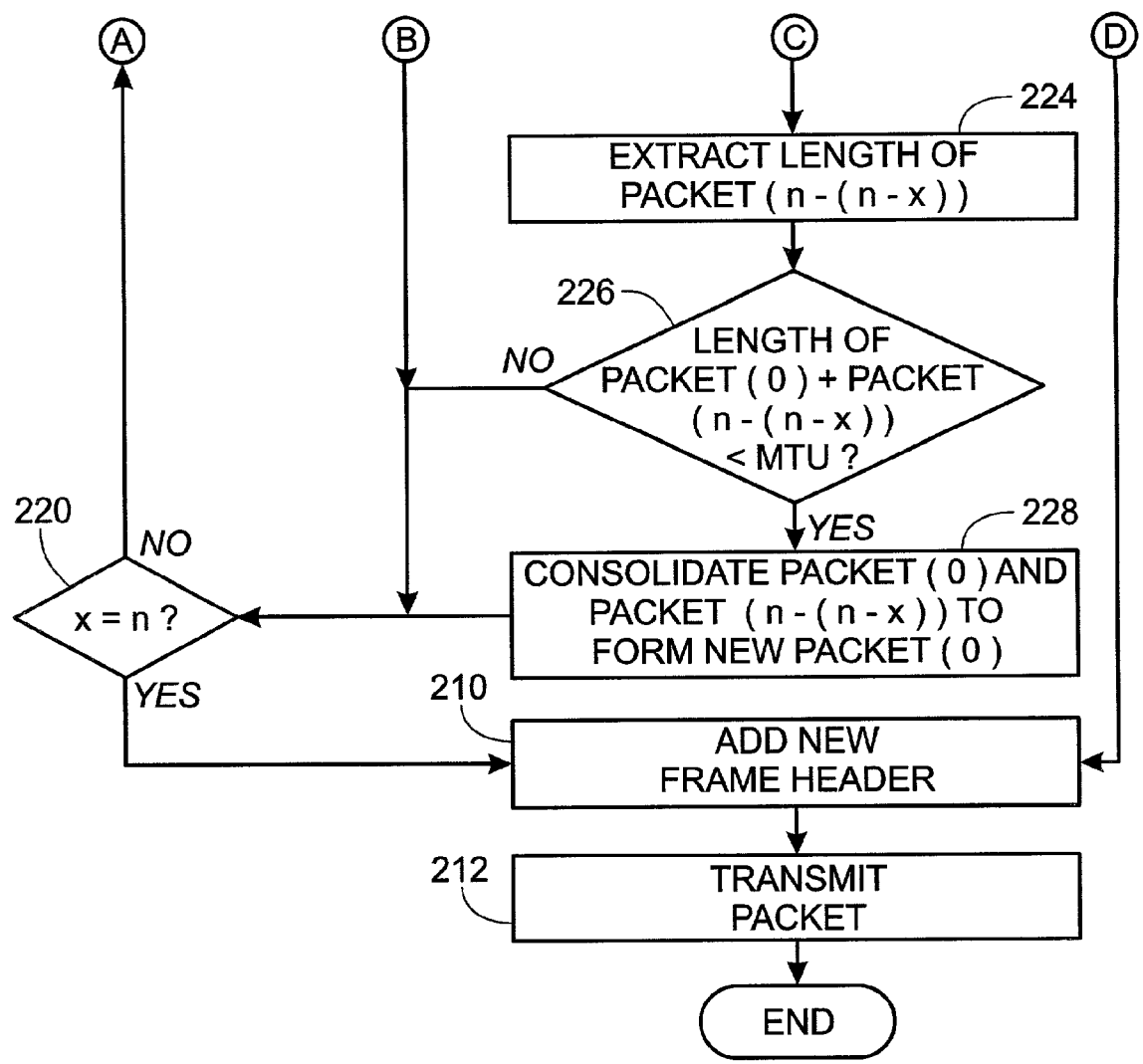
Figure 6B:
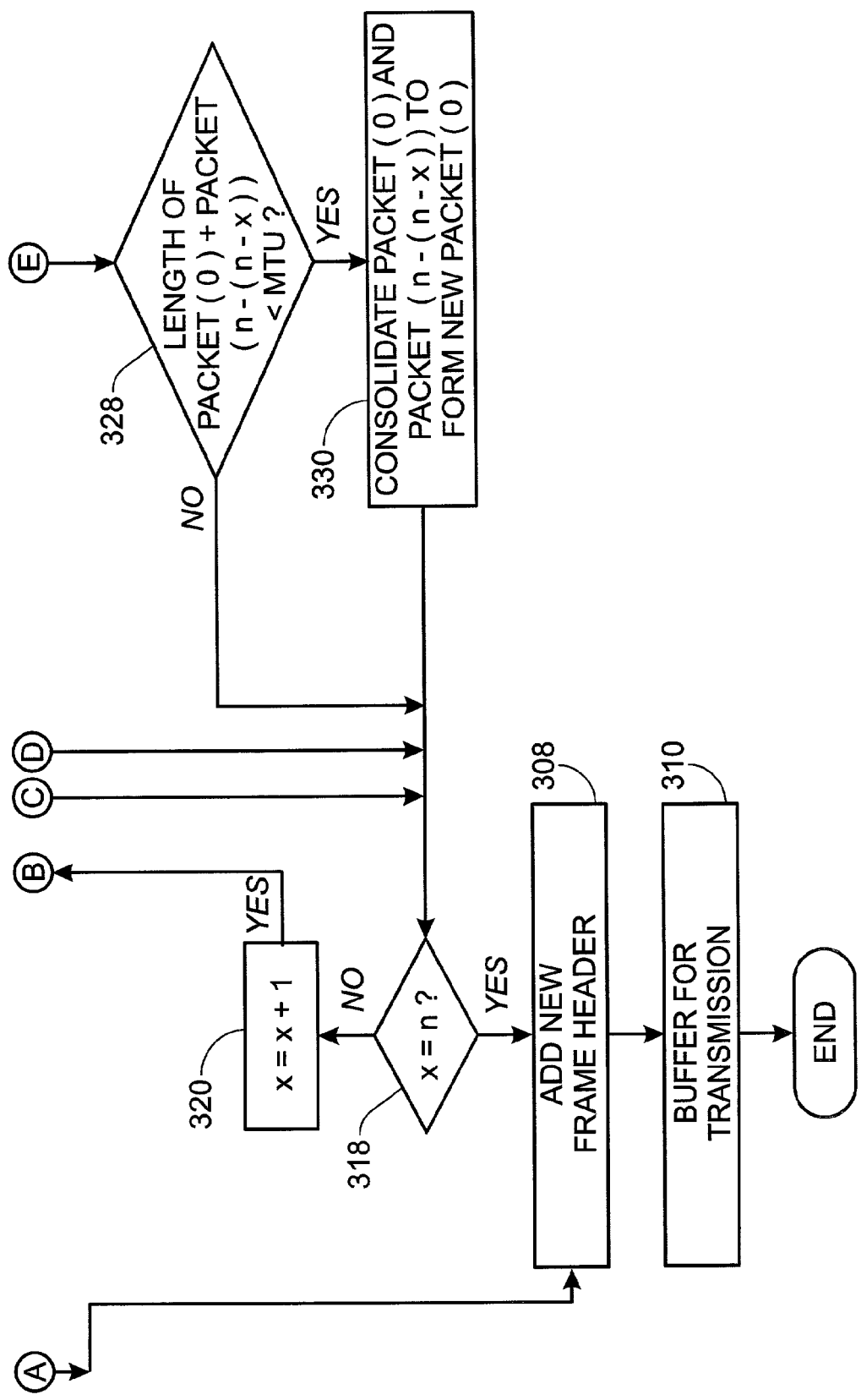

The methods used to identify another packet with the same next-hop address at 108 and to consolidate the packets at 110 may differ depending upon how the packets are identified. FIGS. 5 and 6 illustrate two possible methods of identifying another packet at 108 and consolidating the packets at 110 for two different methods of packet identification.

First, FIG. 5 shows generally at 200 a method of identifying other packets solely by the next-hop address. The method of FIG. 5 may be performed in either input buffer 38 or output buffer 52, and may be carried out by any desired processor within router 30. In method 200, the selected packet that has previously been identified for possible consolidation is referred to as packet(0).

Method 200 begins at 202 with packet(0) buffered in a buffer with n other packets, which possibly have multiple different next-hop addresses. Before other packets with the same next-hop address are identified, the total length of packet(0) is extracted from packet(0)'s IP header at 204. Also, the physical address of the next-hop router for packet (0) is determined at 206 for later comparison to other packets.

Next, it is determined whether packet(0) is suitable for consolidation. This determination may be based on a number of possible criteria, such as data type, priority, etc. As shown in FIG. 5, this determination is made at 208 based solely on the size of packet(0). If packet(0) is equal to or larger than the MTU of the output interface for its next-hop address, then it will not be consolidated. Instead (ignoring any need for possible packet fragmentation), a new frame header will be added to the packet at 210, and the packet will be transmitted at 212.

If it is determined at step 208 that packet(0) is smaller than the MTU of its corresponding output interface, however, then other packets will be identified that may be consolidated with packet(0). This involves checking all n packets buffered with packet(0) for consolidation suitability. First, for x=1 to n, packet (n−(n−x)) in the buffer is identified at 214. Next, the physical address of the next-hop router for packet (n−(n−x)) is determined at 216, and is compared to the next-hop address of packet(0) at 218. If the next-hop addresses are different, then packet (n−(n−x)) is rejected for consolidation with packet(0), the counter variable x is compared to n at 220, and x is not yet equal to n, then x is increased by one at 222. At this point, the subroutine loops back to step 214, where the next packet (n−(n−x)) is identified at 214.

Referring again to step 218, if the physical address of packet (n−(n−x)) is the same as the physical address for packet(0), then the total length value of packet (n−(n−x)) is extracted from packet (n−(n−x))'s IP header at 224. Next, the lengths of packet(0) and packet (n−(n−x)) are added at 226 to find a total length, which is then compared to the MTU of the associated output interface. If the total length of the two packets is greater than the MTU, then packet (n−(n−x)) is rejected for consolidation, x is compared to n at 220, increased by one at 222, and then the next packet (n−(n−x)) is identified at 216. If the total length of the two packets is not greater than the MTU of the output interface, then the two packets are consolidated at 228. As mentioned above, the two packets are consolidated in an end-to-end manner, so that the IP header of the second packet is joined to the end of the first packet. It will be appreciated that the physical address determination and comparison steps 214 and 216 could also be performed after the total length determination and comparison steps 224 and 226 without departing from the scope of the present invention.

After packet(0) and packet (n−(n−x)) are consolidated at 228, packet(0) is redefined to be the consolidated packet. Then, x is compared to n at 220, and if x is less than n, x is increased by one at 222. Next, packet (n−(n−x)) is again identified at 214. The loop defined by steps 214 through 228 continues until either the MTU has been reached or until x=n. When either of these conditions is satisfied, a new frame header is added to the consolidated packet at 210, and the packet is transmitted at 212.

As mentioned above, method 200 will operate equally well in a buffer with all the packets having the same next-hop address or in a buffer with packets having multiple next-hop addresses. However, when used in a buffer with all the packets having the same next-hop address, such as in an output buffer for a particular physical interface, it is possible to omit steps 206, 216 and 218, which provide for the comparison of the physical address of packet(0) and packet (n−(n−x)). In this manner, the amount of processing required for method 200 could be somewhat reduced.

FIG. 6 depicts generally at 300 a second method for identifying another packet at 108 and consolidating the packets at 110. In contrast to method 200, method 300 identifies and consolidates packets that contain an indicator that the packets are carrying a particular type of data, for example, voice data. As with method 200, method 300 may be carried out in any desired buffer within router 30, and may be performed by any desired processor within the router. In FIG. 6, the selected packet that has been identified for possible consolidation is again labeled packet(0).

Method 300 begins at 302 with packet(0) in a buffer with n other packets. First, the physical address of the next-hop router for packet(0) is determined at 304, and the total length of packet(0) is extracted from packet(0)'s IP header at 306. Next, the total length of packet(0) is compared at 307 to the MTU of the output interface from which packet(0) is to be transmitted. If the total length of packet(0) is equal to or greater than the MTU, then (ignoring any possible need for packet fragmentation) a new frame header is added to the packet at 308, and the packet is transmitted at 310 without consolidation.

If, however, the total length of packet(0) is less than the MTU, then next it is determined at 312 whether packet(0) is tagged as a VoIP packet (or other desired type of data packet). If not, then the packet is passed on to steps 308 and 310, where a new frame header is added and packet(0) is transmitted. However, if packet(0) is tagged as a VoIP packet, then it enters a consolidation routine. First, for x=1 to n, the buffer is searched for packet (n−(n−x)) at 314. Next, it is determined if packet (n−(n−x)) is tagged as a VoIP packet at 316. If not, then this packet is rejected for consolidation with packet(0). Then, the counter variable x is compared to n at 318. If x is not equal to n, then x is increased by 1 at 320, and the buffer is again searched for packet (n−(n−x)) at 314.

On the other hand, referring again to step 316, if packet (n−(n−x)) is tagged as a VoIP packet, then the next-hop address for packet (n−(n−x)) is determined at 322 and compared to the next-hop address of packet(0) at 324. If the next-hop address for packet (n−(n−x)) is not the same as that for packet(0), then packet (n−(n−x)) is rejected for consolidation. Then, x is compared to n at 318, increased by one at 320, and the buffer is again searched for packet (n−(n−x)) at 314.

However, if the physical addresses of packet(0) and packet (n−(n−x)) are the same, then the length of packet (n−(n−x)) is extracted from the packet's IP header at 326 and added to the length of packet(0) to determine a total length. The total length is then compared to the MTU of the appropriate output interface at 328. If the total length is greater than the MTU of the appropriate output interface, then packet (n−(n−x)) is rejected for consolidation with packet(0), x is compared to n at 318, increased by one at 320, and the buffer is searched for the next packet (n−(n−x)) at 314. However, if the total length is less than the MTU of the appropriate output interface, then packet(0) and packet (n−(n−x)) are consolidated at 330. After consolidation, x is compared to n at 318, increased by one at 320 if x is less than n, and the buffer is searched for the next packet (n−(n−x)) at 314.

The loop defined by steps 314 through 330 continues until either the MTU has been reached or until x=n. At either of these points, a new frame header is added to the consolidated packet at 308, and the packet is transmitted at 310. As with method 200, if method 300 is carried out in an output buffer where each of the packets have the same next-hop address, the steps for determining the physical address of the next-hop for packet(0), for determining the physical address of the next-hop for packet (n−(n−x)), and for comparing the next-hop addresses may be omitted if desired. Also, the steps of total length determination and comparison 326 and 328 could be performed after the steps of physical address determination and comparison 322 and 324 if desired. Furthermore, router 30 may be configured to put all tagged VoIP packets (or other tagged packets) for a single next-hop address in a separate output buffer. In this situation, the step for determining whether packet (n−(n−x)) is a VoIP packet may also be omitted.

The disclosure set forth above encompasses multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious and directed to one of the inventions. These claims may refer to "an" element or "a first" element or the equivalent thereof; such claims should be understood to include incorporation of one or more such elements, neither requiring nor excluding two or more such elements. Inventions embodied in other combinations and subcombinations of features, functions, elements, and/or properties may be claimed through amendment of the present claims or through presentation of new claims in this or a related application. Such claims, whether directed to a different invention or to the same invention, and whether broader, narrower, equal, or different in scope to the original claims, also are regarded as included within the subject matter of the inventions of the present disclosure.

I claim:

1. A method of optimizing the transmission of a plurality of data packets across a data network at a network traffic device, each data packet having an actual length and including a header with a field giving a total length value for the data packet and a next-hop address, the method comprising:
   receiving the data packets at the network traffic device;
   deconsolidating any consolidated data packets, including extracting the total length value from the header, comparing the total length value to the actual length, and if the actual length is longer than the total length value, removing a segment from the front of the data packet equal in length to the total length value, and then buffering the segment
   after deconsolidating any consolidated data packets, buffering the data packets;
   identifying a first data packet;
   identifying a second data packet with the same next-hop address as the first data packet;
   consolidating the first data packet with the second data packet to form a consolidated packet; and
   transmitting the consolidated data packet.

2. The method of claim 1, wherein the extracting, comparing and removing are performed repeatedly until the actual length is equal to the total length value.

3. A method of optimizing the transmission of a plurality of data packets across a data network at a network traffic device, each data packet having an actual length and a next-hop address, the method comprising:
   receiving the data packets at the network traffic device;
   buffering the data packets;
   identifying a first data packet, wherein identifying a first data packet includes comparing the actual length of the data packet to a maximum transmission unit;
   identifying a second data packet with the same next-hop address as the first data packet;
   consolidating the first data packet with the second data packet to form a consolidated packet; and
   transmitting the consolidated data packet.

4. The method of claim 3, wherein identifying a second data packet with the same next-hop address as the first data packet includes checking the actual length of the second data packet and adding the actual length of the second data packet to the actual length of the first data packet to find a total length, comparing the total length to the maximum transmission unit, and not consolidating the first data packet and the second data packet if the total length is equal to or greater than the maximum transmission unit.

5. The method of claim 3, wherein the network traffic device is one of a router, bridge and switch.

6. The method of claim 3, each of the data packets having opposing ends, wherein consolidating the first data packet with the second data packet to form a consolidated packet includes joining the first data packet and the second data packet in an end-to-end manner.

7. A method of transmitting a plurality of voice data packets across a network, each of the plurality of voice data packets having a next-hop address and including a tag identifying the packet as a voice data packet, the method comprising:
   receiving data packets at a network traffic device, the data packets including plural voice data packets and plural non-voice data packets;
   checking a first data packet for the tag;
   after checking a first data packet for the tag, buffering each of the received data packets, wherein buffering each of the received data packets includes buffering data packets with the tag separately from data packets without the tag;
   if thd first data packet has the tag, then identifying a second data packet with the tag and with the same next-hop address as the first data packet;
   consolidating the first data packet with the second data packet to form a consolidated packet; and
   transmitting the consolidated packet.

8. A method of optimizing transmission of a plurality of data packets across a data network at a network traffic device, the network traffic device having a buffer, each of the plurality of data packets being stored in the buffer and having a next-hop address, the method comprising:
   selecting a first data packet from the plurality of stored packets;
   determining the next-hop address for the first data packet;
   checking the size of the first data packet;
   comparing the size of the first data packet to a predetermined maximum transmission unit;
   if the size of the first data packet is smaller than the maximum transmission unit, then identifying a second data packet from the plurality of stored data packets with the same next-hop address as the selected data packet;
   checking the size of second data packet;
   adding the size of the first data packet and the second data packet to find a total size;
   comparing the total size to the maximum transmission unit;
   if the total size is less than or equal to the maximum transmission unit, consolidating the selected data packet and the second data packet to form a consolidated packet; and
   transmitting the consolidated packet.

9. The method of claim 8, wherein selecting a data packet from the plurality of buffered data packets includes checking for an indicator contained within the data packet indicating that the data packet is to be consolidated.

10. The method of claim 9, wherein the indicator is a tag indicating the type of data contained within the packet.

11. The method of claim 9, wherein the indicator is a priority flag contained within a header of the data packet.

12. The method of claim 8, further comprising identifying a third data packet from the plurality of buffered data packets with the same next-hop address as the consolidated packet, checking the size of the third packet, and repeating the adding, comparing, and consolidating steps before transmitting the consolidated packet.

13. A network traffic forwarding system configured to optimize flow of data packets across a data network, each data packet having an actual length and a next-hop address, and including a header with a field giving a total length value for the data packet, the forwarding system comprising:
   a plurality of network interface ports configured to be connected to the network to send and receive data packets;
   memory configured for buffering received packets; and
   a processor configured to deconsolidate any received data packets that are consolidated packets, wherein the processor is configured to extract the total length value from the header, to compare the total length value to the actual length, and if the actual length is longer than the total length value, to remove a segment from the front of the data packet equal in length to the total length value, and then to buffer the segment, and wherein, upon receipt of a first data packet by one of the plurality of network interface ports, the processor is configured to identify a second data packet buffered in the memory with the same next-hop address as the first data packet, and to consolidate the first data packet and the second data packet to form a consolidated packet for transmission across the network.

14. The network traffic forwarding system of claim 13, wherein the processor is configured to repeatedly extract, compare and remove until the actual length is equal to the total length value.

15. A network traffic forwarding system configured to optimize flow of data packets across a data network, each data packet having an actual length and a next-hop address, the forwarding system comprising:
   a plurality of network interface ports configured to be connected to the network to send and receive data packets;
   memory configured for buffering received packets; and
   a processor configured, upon receipt of a first data packet by one of the plurality of network interface ports, to identify a second data packet buffered in the memory with the same next-hop address as the first data packet, and to consolidate the first data packet and the second data packet to form a consolidated packet for transmission across the network, wherein the processor is further configured to compare the actual length of the first data packet to a maximum transmission unit, and if the actual length of the first data packet is greater than or equal to the maximum transmission unit, to transmit the selected data packet without consolidation.

16. The network traffic forwarding system of claim 15, wherein the processor is further configured to check the actual length of the second data packet, to add the actual length of the second data packet to the actual length of the selected data packet to find a total length, to compare the total length to the maximum transmission unit, and not to consolidate the selected data packet and second data packet if the total length is equal to or greater than the maximum transmission unit.

17. An article comprising:
   a storage medium having a plurality of machine-readable instructions, the instructions being configured to be executed by a network traffic device to optimize the transmission of a plurality of data packets across a data network at the network traffic device, the network traffic device having a buffer, each of the plurality of data packets being stored in the buffer and having a next-hop address, wherein execution of the instructions provides for the steps of selecting a first data packet from the plurality of stored packets;

determining the next-hop address for the first data packet;

checking the size of the first data packet;

comparing the size of the first data packet to a predetermined maximum transmission unit;

if the size of the first data packet is smaller than the maximum transmission unit, then identifying a second data packet from the plurality of stored data packets with the same next-hop address as the selected data packet;

checking the size of first data packet;

adding the size of the first data packet and the second data packet to find a total size;

comparing the total size to the maximum transmission unit;

if the total size is less than or equal to the maximum transmission unit, consolidating the selected data packet and the second data packet to form a consolidated packet; and transmitting the consolidated packet.

* * * * *

UNITED STATES PATENT AND TRADEMARK OFFICE
CERTIFICATE OF CORRECTION

PATENT NO. : 7,031,338 B2 Page 1 of 1
APPLICATION NO. : 09/940359
DATED : April 18, 2006
INVENTOR(S) : Jeffrey S. Weaver It is certified that error appears in the above-identified patent and that said Letters Patent is hereby corrected as shown below:

In column 9, line 22, in Claim 7, delete "thd" and insert -- the --, therefor.

Signed and Sealed this

Twenty-third Day of June, 2009

JOHN DOLL
*Acting Director of the United States Patent and Trademark Office*